(12) United States Patent
Yang et al.

(10) Patent No.: US 10,991,534 B1
(45) Date of Patent: Apr. 27, 2021

(54) LEAKAGE PROTECTOR

(71) Applicant: Dongguan City Tuocheng Industries Co., Ltd., Dongguan (CN)

(72) Inventors: Juntuo Yang, Dongguan (CN); Siwei Zhu, Dongguan (CN)

(73) Assignee: Dongguan City Tuocheng Industries Co., Ltd., Dongguan (CN)

( * ) Notice: Subject to any disclaimer, the term of this patent is extended or adjusted under 35 U.S.C. 154(b) by 0 days.

(21) Appl. No.: 16/800,714

(22) Filed: Feb. 25, 2020

(30) Foreign Application Priority Data

Dec. 31, 2019 (CN) .......................... 201922499047.8

(51) Int. Cl.
*H02H 1/00* (2006.01)
*H01H 71/32* (2006.01)
*H01H 71/08* (2006.01)
*H02H 3/28* (2006.01)
*H02H 3/04* (2006.01)

(52) U.S. Cl.
CPC .......... *H01H 71/323* (2013.01); *H01H 71/08* (2013.01); *H01H 71/325* (2013.01); *H02H 1/0007* (2013.01); *H02H 3/044* (2013.01); *H02H 3/28* (2013.01)

(58) Field of Classification Search
CPC ........ H01H 50/60; H01H 50/16; H01H 33/59; H01H 33/044; H01H 45/02; H01H 51/2272; H01H 51/29; H01H 71/02; H01H 71/323; H01H 71/325; H01H 71/08; H01H 9/26; H01L 2924/13055; H02H 3/28

See application file for complete search history.

(56) References Cited

U.S. PATENT DOCUMENTS 7,889,464 B2 * 2/2011 Chen ...................... H01H 83/14
361/42

* cited by examiner

*Primary Examiner* — Bryan R Perez
(74) *Attorney, Agent, or Firm* — Wang Law Firm, Inc.

(57) ABSTRACT

A leakage protector comprises a housing, a rotating member, a MCU (Microprogrammed Control Unit), an electromagnet, and a leakage protection module. The rotating member, the MCU, the electromagnet and the leakage protection module are all disposed in the housing. The housing is provided with an input terminal and an output terminal. The MCU is configured to perform power supply through the input terminal. The leakage protector has a compact structure while reducing the cost, and effectively reduces the occupied space.

10 Claims, 7 Drawing Sheets

LEAKAGE PROTECTOR

FIELD OF THE INVENTION

The present invention relates to a protector for electrical appliances, and more particular to a leakage protector.

BACKGROUND OF THE INVENTION

In order to prevent an electrical appliance from short-circuiting or leaking when in use to cause a great loss, a leakage protector is provided for use, so as to avoid the above situations. However, most conventional leakage protectors use a circuit breaker. Although the circuit breaker is safe and reliable, it is large in size, occupies a lot of space, and is difficult to be widely used.

Accordingly, the inventor of the present invention has devoted himself based on his many years of practical experiences to solve these problems.

SUMMARY OF THE INVENTION

In view of the shortcomings and deficiencies of the prior art, the primary object of the present invention is to provide a leakage protector. The leakage protector has a compact structure while reducing the cost, and effectively reduces the occupied space.

The present invention adopts the following technical solutions:

A leakage protector comprises a housing, a rotating member, a MCU (Microprogrammed Control Unit), an electromagnet, and a leakage protection module. The rotating member, the MCU, the electromagnet and the leakage protection module are all disposed in the housing. The housing is provided with an input terminal and an output terminal. The MCU is configured to connect an external power supply through the input terminal for power supply. The electromagnet is configured to control connection and disconnection between the input terminal and the output terminal. The rotating member is rotatably disposed in the housing. A magnetic member is provided in the rotating member. The electromagnet is configured to attract the magnetic member to drive the rotating member to rotate. One side of the rotating member is provided with a first pressing member. The housing is provided with a first immovable contact member electrically connected to the output terminal and a first elastic member electrically connected to the output terminal. When the input terminal is connected to the external power source, the input terminal supplies power to the electromagnet, and the electromagnet attracts the magnetic member to drive the rotating member to rotate, so that the first pressing member is pressed against the first elastic member to allow the first elastic member to contact the first immovable contact member, thereby connecting the input terminal and the output terminal. When the input terminal and the output terminal are short-circuited or leak, the leakage protection module sends a signal to the MCU so that the MCU controls the electromagnet to disconnect the input terminal from the output terminal.

Wherein, the leakage protector further comprises a self-detection module. The self-detection module includes a rectifier SCR, a diode D7, a resistor R15, and a resistor R22. The MCU is a FM2152 MCU. A No. 13 pin of the MCU is electrically connected to a control electrode of the rectifier SCR via the resistor R15. A cathode of the rectifier SCR is grounded. An anode of the rectifier SCR is electrically connected to an anode of the diode D7. A cathode of the diode D7 is electrically connected to a No. 6 pin of the MCU and one end of the resistor R22.

Wherein, the leakage protection module includes a first zero sequence current transformer and a second zero sequence current transformer. The input terminal includes an LIN terminal and a NIN terminal. The output terminal includes an LOUT terminal and a NOUT terminal. The LIN terminal is connected with the LOUT terminal to form an internal live wire. The LOUT terminal is connected with the NOUT terminal to form an internal neutral wire. The internal live wire and the internal neutral wire are inductively, electrically connected to the first zero sequence current transformer. The internal live wire and the internal neutral wire are inductively, electrically connected to the second zero sequence current transformer.

Wherein, the MCU is a FM2152 MCU. A No. 4 pin of the MCU is electrically connected to a No. 5 pin of the MCU through the first zero sequence current transformer and the second zero sequence current transformer in sequence.

Wherein, another side of the rotating member is provided with a second pressing member. The housing is further provided with a second immovable contact member electrically connected to the output terminal and a second elastic member electrically connected to the output terminal. When the input terminal is connected to the external power source, the input terminal supplies power to the electromagnet, and the electromagnet attracts the magnetic member to drive the rotating member to rotate, so that the second pressing member is pressed against the second elastic member, and the second elastic member is in contact with the second immovable contact member to realize connection between the input terminal and the output terminal.

Wherein, the second pressing member and the first pressing member are disposed symmetrically relative to the rotating member. The second elastic member and the first elastic member are disposed symmetrically relative to the rotating member. The second immovable contact member contact and the first immovable contact member are disposed symmetrically relative to the rotating member.

Wherein, the first elastic member includes a first elastic plate and a movable contact for contacting the first immovable contact member. The first elastic plate includes a fixed portion, an elastic portion, and an extension portion. One end of the fixed portion and one end of the extension portion are connected to two ends of the elastic portion, respectively. The movable contact, the fixed portion, the elastic portion and the extension portion are in electrical communication with each other. The fixed portion is fixedly disposed on the housing. The movable contact is fixedly disposed on another end of the extension portion.

Wherein, the leakage protector further comprises a ground terminal. The ground terminal includes a ground plug, a ground extension tube, and a ground output terminal. One end of the ground plug extends out of the housing and is fixedly disposed at one end of the housing. The ground output terminal is disposed at another end of the housing. The ground extension tube includes a first bent tube, a second bent tube, and a first straight tube. The first bent tube, the second bent tube and the first straight tube are arranged in sequence.

Wherein, an insulation protection tube is fitted onto the ground extension tube.

Wherein, the leakage protector further comprises an LED1 and an LED2. The LED1 and the LED2 are disposed on the housing.

The beneficial effects of the present invention are described below.

The leakage protector has a compact structure and occupies less space. The leakage protector of the present invention controls the electromagnet to drive the rotating member to rotate through the MCU, so that the input terminal and the output terminal are switched to be connected or disconnected so as to achieve the effect of leakage protection. Compared with a circuit breaker, the components of the present invention are small in size, so that the structure of the present invention can be more compact, occupying less space. It is beneficial for the leakage protector to be widely used.

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein.

DESCRIPTION OF THE PREFERRED EMBODIMENTS

Figure 1:
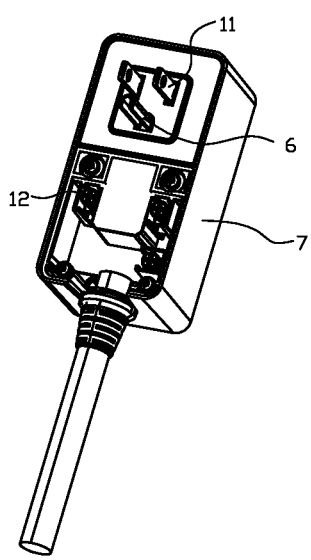
FIG. 1 is a perspective view of the present invention.

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

It should be noted that the structures shown in the drawings of this description are only used to cooperate with the content disclosed in the description for those skilled in this technology to understand and read, and are not intended to limit the conditions that can be implemented by this invention, so it has no technical significance. Any modification or change of the structures, without affecting the efficacy and purpose achieved by the present invention, should still fall within the scope protected by the technical content disclosed by the present invention.

Figure 2:
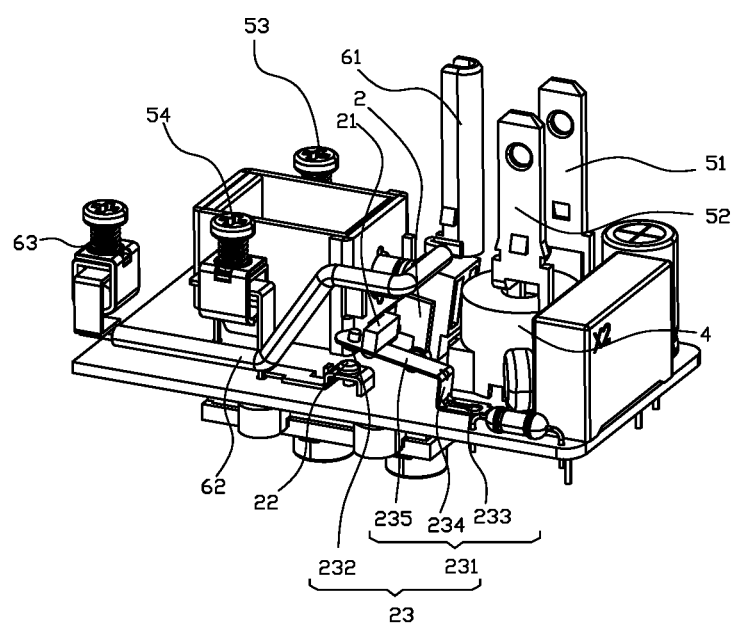
FIG. 2 is a schematic view of the internal structure of the present invention.
Figure 3:
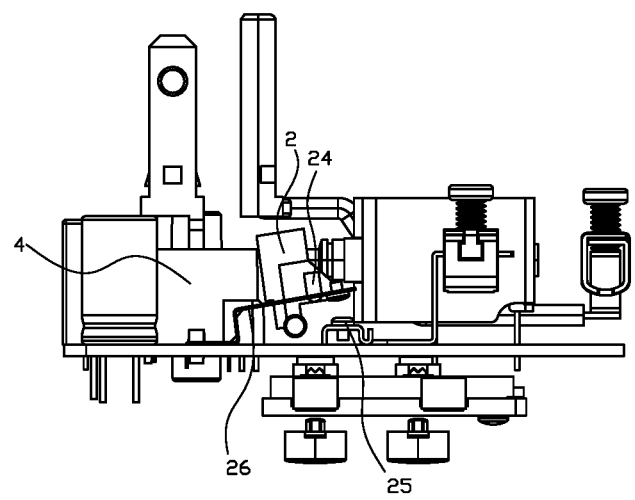
FIG. 3 is another schematic view of the internal structure of the present invention.
Figure 4:
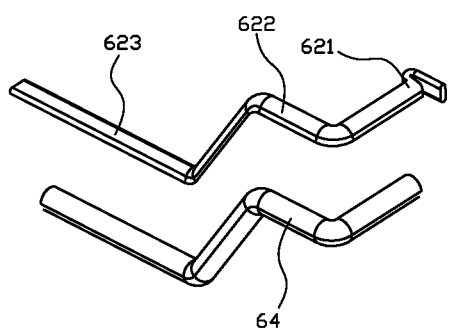
FIG. 4 is an exploded view of the ground extension tube of the present invention.
Figure 5:
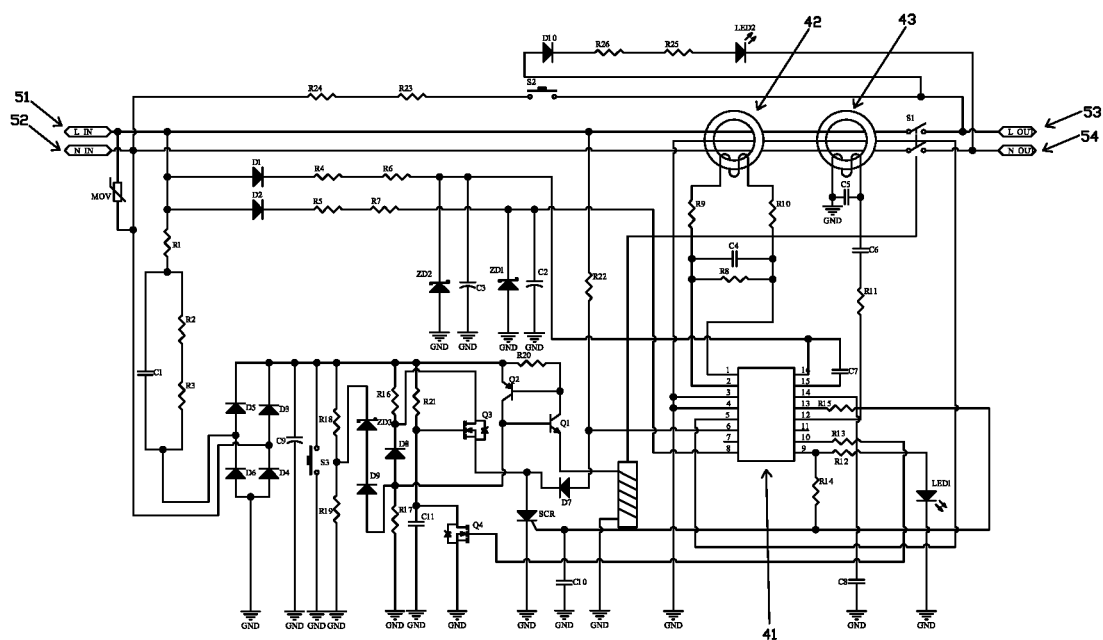
FIG. 5 is a circuit diagram of the present invention.
Figure 6:
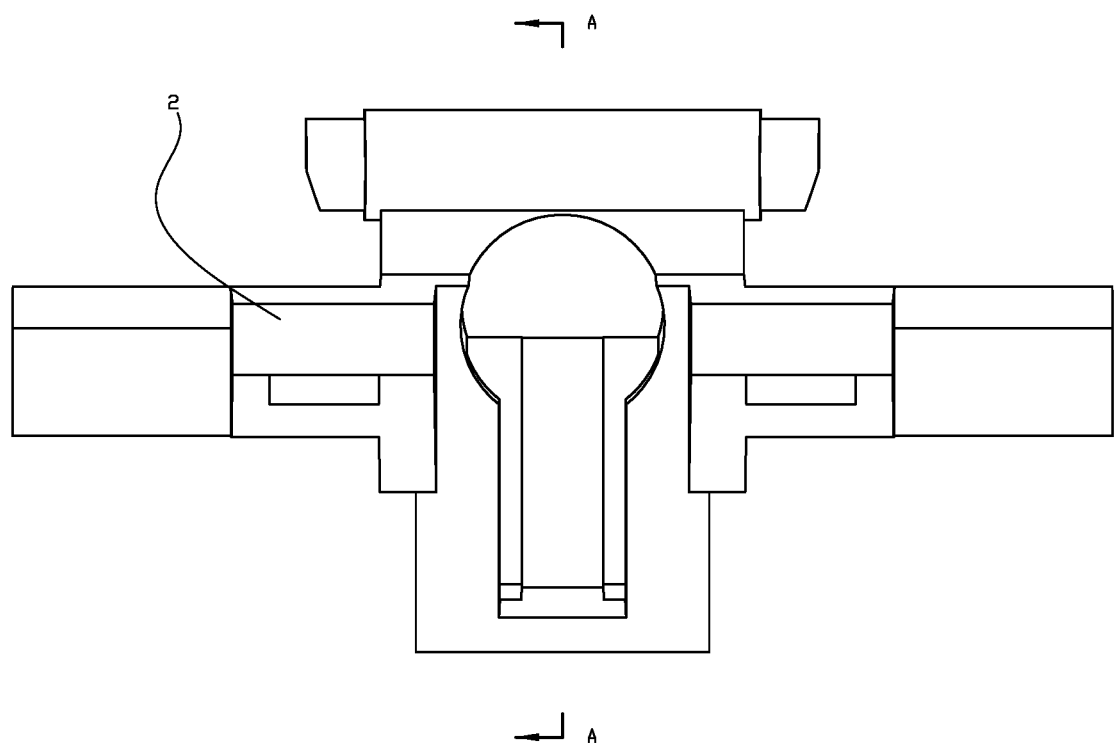
FIG. 6 is a perspective view of the rotating member of the present invention.
Figure 7:
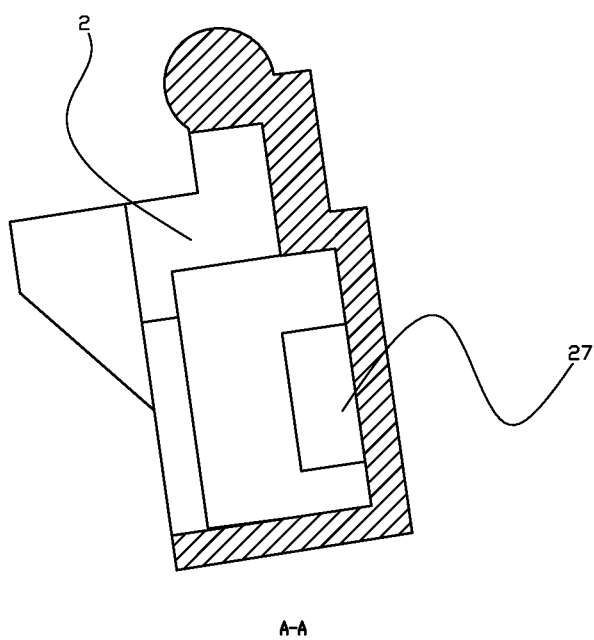
FIG. 7 is a cross-sectional view taken along line A-A of FIG. 6.

As shown in FIG. 1 through FIG. 5, a leakage protector comprises a housing 7, a rotating member 2, a MCU (Microprogrammed Control Unit) 41, an electromagnet 3, and a leakage protection module 4. The rotating member 2, the MCU 41, the electromagnet 3 and the leakage protection module 4 are all disposed in the housing 7. The housing 7 is provided with an input terminal 11 and an output terminal 12. The MCU 41 is configured to connect an external power supply through the input terminal 11 for power supply. The electromagnet 3 is configured to control connection and disconnection between the input terminal 11 and the output terminal 12. The rotating member 2 is rotatably disposed in the housing 7. A magnetic member 27 is provided in the rotating member 2. The electromagnet 3 is configured to attract the magnetic member 27 to drive the rotating member 2 to rotate. One side of the rotating member 2 is provided with a first pressing member 21. The housing 7 is provided with a first immovable contact member 22 electrically connected to the output terminal 12 and a first elastic member 23 electrically connected to the output terminal 12. When the input terminal 11 is connected to the external power source, the input terminal 11 supplies power to the electromagnet 3, and the electromagnet 3 attracts the magnetic member 27 to drive the rotating member 2 to rotate, so that the first pressing member 21 is pressed against the first elastic member 23 to allow the first elastic member 23 to contact the first immovable contact member 22, thereby connecting the input terminal 11 and the output terminal 12. When the input terminal 11 and the output terminal 12 are short-circuited or leak, the leakage protection module 4 sends a signal to the MCU 41 so that the MCU 41 controls the electromagnet 3 to disconnect the input terminal 11 from the output terminal 12.

Specifically, the leakage protection module 4 includes a first zero sequence current transformer 42 and a second zero sequence current transformer 43. The input terminal 11 includes an LIN terminal 51 and a NIN terminal 52. The output terminal 12 includes an LOUT terminal 53 and a NOUT terminal 54. The LIN terminal 51 is connected with the LOUT terminal 53 to form an internal live wire. The LOUT terminal 53 is connected with the NOUT terminal 54 to form an internal neutral wire. Both the internal live wire and the internal neutral wire are inductively, electrically connected to the first zero sequence current transformer 42. Both the internal live wire and the internal neutral wire are inductively, electrically connected to the second zero sequence current transformer 43. The MCU 41 is a FM2152 MCU. A No. 4 pin of the MCU 41 is electrically connected to a No. 5 pin of the MCU 41 through the first zero sequence current transformer 42 and the second zero sequence current transformer 43 in sequence.

In use, the leakage protector of this embodiment is connected to the power supply, namely, connected between the live and neutral wires and an electrical appliance used. If no leakage occurs in the electrical appliance, the leakage detection module detects that the current vector between the live and neutral wires is zero, and the first zero sequence current transformer 42 and the second zero sequence current transformer 43 will not generate an induced current. The input terminal 11 of the electromagnet 3 is at a high level, and the electromagnet 3 is energized to attract the rotating member 2 to turn, thereby connecting the first immovable contact member 22 and the first elastic member 23, so that the input terminal 11 and the output terminal 12 are conducted. If the electrical appliance leaks, the current vector between the live and neutral wires is not equal to zero. The first zero sequence current transformer 42 and the second zero sequence current transformer 43 generate an induced current and send it to MCU 41. The MCU 41 sends a control signal to the electromagnet 3 and cuts off the electromagnet 3 to release the contact, so as to cut off the live and neutral wires at the same time. The electrical connection relationship between the first zero sequence current transformer 42, the second zero sequence current transformer 43, the electromagnet 3 and the MCU 41 can be referred to FIG. 3. Specifically, after the first zero sequence current transformer 42 and the second zero sequence current transformer 43 generates an induced current, a No. 10 pin of MCU 41 generates a level. A field-effect transistor Q4 and a field-effect transistor Q3 connected to the No. 10 pin act on the input terminal 11 of the electromagnet 3, so that the input terminal 11 of the electromagnet 3 is at a low level, so that the electromagnet 3 loses magnetism. After the rotating member 2 loses its attractive force, it bounces off due to the elastic force of the elastic member itself, thereby disconnecting the input terminal 11 from the output terminal 12, so as to play a role of leakage protection.

In this embodiment, the leakage protector further comprises a self-detection module. The self-detection module includes a rectifier SCR, a diode D7, a resistor R15, and a resistor R22. The MCU 41 is a FM2152 MCU. A No. 13 pin of the MCU 41 is electrically connected to a control electrode of the rectifier SCR via the resistor R15, and a cathode of the rectifier SCR is grounded. An anode of the rectifier SCR is electrically connected to an anode of the diode D7. A cathode of the diode D7 is electrically connected to a No. 6 pin of the MCU 41 and one end of the resistor R22. Through the arrangement of the above circuit, the present invention provides a self-detection function for damage to each component. Specifically, a No. 15 pin of the MCU 41 outputs a high level, and the voltage of the resistor R22 is lowered after the rectifier SCR is connected. At this time, the first zero sequence current transformer 42 or the second zero sequence current transformer 43 will generate an unbalanced voltage to the No. 6 pin of the MCU 41 for detecting whether the MCU 41 is damaged. In addition, the No. 4 pin and the No. 5 pin of the MCU 41 are configured to detect whether the first zero sequence current transformer 42 and the second zero sequence current transformer 43 are damaged, thereby further ensuring the reliability of the present invention.

Specifically, another side of the rotating member 2 is provided with a second pressing member 24. The housing 7 is further provided with a second immovable contact member 25 electrically connected to the output terminal 12 and a second elastic member 26 electrically connected to the output terminal 12. When the input terminal 11 is connected to the external power source, the input terminal 11 supplies power to the electromagnet 3, and the electromagnet 3 attracts the magnetic member 27 to drive the rotating member 2 to rotate, so that the second pressing member 24 is pressed against the second elastic member 26, and the second elastic member 26 is in contact with the second immovable contact member 25 to realize connection between the input terminal 11 and the output terminal 12. Preferably, the second pressing member 24 and the first pressing member 21 are disposed symmetrically relative to the rotating member 2. The second elastic member 26 and the first elastic member 23 are disposed symmetrically relative to the rotating member 2. The second immovable contact member contact 25 and the first immovable contact member 22 are disposed symmetrically relative to the rotating member 2. Through this arrangement, the force of the rotating member 2 when rotated under stress is uniform, and the reliability of the present invention when it is connected or disconnected is increased.

Specifically, the first elastic member 23 includes a first elastic plate 231 and a movable contact 232 for contacting the first immovable contact member 22. The first elastic plate 231 includes a fixed portion 233, an elastic portion 234, and an extension portion 235. One end of the fixed portion 233 and one end of the extension portion 235 are connected to two ends of the elastic portion 234, respectively. The movable contact 232, the fixed portion 233, the elastic portion 234 and the extension portion 235 are in electrical communication with each other. The fixed portion 233 is fixedly disposed on the housing 7. The movable contact 232 is fixedly disposed on another end of the extension portion 235. Preferably, one end of the fixed portion 233 and the extension portion 235 are vertically disposed at the two ends of the elastic portion 234, respectively. This arrangement can further increase the service life of the first elastic plate 231. In this embodiment, the structure of the second elastic member 26 is the same as that of the first elastic member 23, so the details are not described herein again.

Specifically, as shown in FIGS. 1-4, the leakage protector further comprises a ground terminal 6. The ground terminal 6 includes a ground plug 61, a ground extension tube 62, and a ground output terminal 63. One end of the ground plug 61 extends out of the housing 7 and is fixedly disposed at one end of the housing 7. The ground output terminal 63 is disposed at another end of the housing 7. The ground extension tube 62 includes a first bent tube 621, a second bent tube 622, and a first straight tube 623. The first bent tube 621, the second bent tube 622 and the first straight tube 623 are arranged in sequence. By providing the ground extension tube 62, the structure of the present invention can be more compact. An insulation protection tube 64 is fitted onto the ground extension tube 62, which can play a certain role in protecting the ground terminal 6.

Specifically, the leakage protector further comprises an LED1 and an LED2. Both the LED1 and the LED2 are disposed on the housing 7. The LED1 corresponds to a fault light. The LED2 corresponds to a normal light. If there is no leakage or short-circuit accident, the LED2 lights up, or the LED1 lights up to remind the user.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A leakage protector, comprising a housing (7), the housing (7) being provided with an input terminal (11) and an output terminal (12), characterized in that the leakage protector further comprises a rotating member (2), a MCU (Microprogrammed Control Unit) (41), an electromagnet (3) and a leakage protection module (4) in the housing (7), the MCU (41) is configured to connect an external power supply through the input terminal (11) for power supply, the electromagnet (3) is configured to control connection and disconnection between the input terminal (11) and the output terminal (12);

the rotating member (2) is rotatably disposed in the housing (7), a magnetic member (27) is provided in the rotating member (2), the electromagnet (3) is configured to attract the magnetic member (27) to drive the rotating member (2) to rotate;

one side of the rotating member (2) is provided with a first pressing member (21), the housing (7) is provided with a first immovable contact member (22) electrically connected to the output terminal (12) and a first elastic member (23) electrically connected to the output terminal (12), when the input terminal (11) is connected to the external power source, the input terminal (11) supplies power to the electromagnet (3), and the electromagnet (3) attracts the magnetic member (27) to drive the rotating member (2) to rotate, so that the first pressing member (21) is pressed against the first elastic member (23) to allow the first elastic member (23) to contact the first immovable contact member (22), thereby connecting the input terminal (11) and the output terminal (12);

when the input terminal (11) and the output terminal (12) are short-circuited or leak, the leakage protection module (4) sends a signal to the MCU (41) so that the MCU

(41) controls the electromagnet (3) to disconnect the input terminal (11) from the output terminal (12).

2. The leakage protector as claimed in claim 1, further comprising a self-detection module, the self-detection module including a rectifier SCR, a diode D7, a resistor R15, and a resistor R22; the MCU (41) being a FM2152 MCU, a No. 13 pin of the MCU (41) being electrically connected to a control electrode of the rectifier SCR via the resistor R15, a cathode of the rectifier SCR being grounded, an anode of the rectifier SCR being electrically connected to an anode of the diode D7, a cathode of the diode D7 being electrically connected to a No. 6 pin of the MCU (41) and one end of the resistor R22.

3. The leakage protector as claimed in claim 1, wherein the leakage protection module (4) includes a first zero sequence current transformer (42) and a second zero sequence current transformer (43), the input terminal (11) includes an LIN terminal (51) and a NIN terminal (52), the output terminal (12) includes an LOUT terminal (53) and a NOUT terminal (54), the LIN terminal (51) is connected with the LOUT terminal (53) to form an internal live wire, the LOUT terminal (53) is connected with the NOUT terminal (54) to form an internal neutral wire, the internal live wire and the internal neutral wire are inductively, electrically connected to the first zero sequence current transformer (42), the internal live wire and the internal neutral wire are inductively, electrically connected to the second zero sequence current transformer (43).

4. The leakage protector as claimed in claim 3, wherein the MCU (41) is a FM2152 MCU, a No. 4 pin of the MCU (41) is electrically connected to a No. 5 pin of the MCU (41) through the first zero sequence current transformer (42) and the second zero sequence current transformer (43) in sequence.

5. The leakage protector as claimed in claim 1, wherein another side of the rotating member (2) is provided with a second pressing member (24), the housing (7) is further provided with a second immovable contact member (25) electrically connected to the output terminal (12) and a second elastic member (26) electrically connected to the output terminal (12);

when the input terminal (11) is connected to the external power source, the input terminal (11) supplies power to the electromagnet (3), and the electromagnet (3) attracts the magnetic member (27) to drive the rotating member (2) to rotate, so that the second pressing member (24) is pressed against the second elastic member (26), and the second elastic member (26) is in contact with the second immovable contact member (25) to realize connection between the input terminal (11) and the output terminal (12).

6. The leakage protector as claimed in claim 5, wherein the second pressing member (24) and the first pressing member (21) are disposed symmetrically relative to the rotating member (2), the second elastic member (26) and the first elastic member (23) are disposed symmetrically relative to the rotating member (2), the second immovable contact member contact (25) and the first immovable contact member (22) are disposed symmetrically relative to the rotating member (2).

7. The leakage protector as claimed in claim 1, wherein the first elastic member (23) includes a first elastic plate (231) and a movable contact (232) for contacting the first immovable contact member (22), the first elastic plate (231) includes a fixed portion (233), an elastic portion (234) and an extension portion (235), one end of the fixed portion (233) and one end of the extension portion (235) are connected to two ends of the elastic portion (234) respectively, the movable contact (232), the fixed portion (233), the elastic portion (234) and the extension portion (235) are in electrical communication with each other; the fixed portion (233) is fixedly disposed on the housing (7), the movable contact (232) is fixedly disposed on another end of the extension portion (235).

8. The leakage protector as claimed in claim 1, further comprising a ground terminal (6), the ground terminal (6) including a ground plug (61), a ground extension tube (62) and a ground output terminal (63), one end of the ground plug (61) extending out of the housing (7) and being fixedly disposed at one end of the housing (7), the ground output terminal (63) being disposed at another end of the housing (7);

the ground extension tube (62) including a first bent tube (621), a second bent tube (622) and a first straight tube (623), the first bent tube (621), the second bent tube (622) and the first straight tube (623) being arranged in sequence.

9. The leakage protector as claimed in claim 8, wherein an insulation protection tube (64) is fitted onto the ground extension tube (62).

10. The leakage protector as claimed in claim 1, further comprising an LED1 and an LED2, the LED1 and the LED2 being disposed on the housing (7).

\* \* \* \* \*